United States Patent
Sangwan et al.

(10) Patent No.: US 6,672,085 B1
(45) Date of Patent: Jan. 6, 2004

(54) HIERARCHICAL CONTROL METHOD FOR A MOTOR VEHICLE HVAC SYSTEM

(75) Inventors: Karma Vir Sangwan, East Amherst, NY (US); Thomas Martin Urbank, Lockport, NY (US); Charles Andrew Archibald, Lockport, NY (US); John F. Wurster, Irving, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/280,033

(22) Filed: Oct. 24, 2002

(51) Int. Cl.⁷ ............................. B60H 1/32; F25B 27/00; F25B 49/02
(52) U.S. Cl. ................ 62/133; 62/323.4; 62/126; 62/129; 62/131; 62/230
(58) Field of Search ....................... 62/133, 228.1, 62/228.3, 228.4, 228.5, 243, 229, 230, 323.1, 323.4, 126, 127, 129, 130, 131, 176.1, 176.3, 176.6

(56) References Cited

U.S. PATENT DOCUMENTS

| | | | |
|---|---|---|---|
| 4,510,764 A | * 4/1985 | Suzuki | 62/133 |
| 4,606,197 A | * 8/1986 | Takahashi et al. | 62/133 |
| 4,698,977 A | * 10/1987 | Takahashi | 62/133 |
| 4,796,438 A | * 1/1989 | Sato | 62/133 |
| 5,022,232 A | * 6/1991 | Sakamoto et al. | 62/133 |
| 5,117,643 A | * 6/1992 | Sakurai et al. | 62/133 |
| 5,893,272 A | * 4/1999 | Hanselmann et al. | 62/133 |

* cited by examiner

Primary Examiner—Harry B. Tanner
(74) Attorney, Agent, or Firm—Patrick M. Griffin

(57) ABSTRACT

A control method for a motor vehicle HVAC system categorizes potentially conflicting override commands for at least one control parameter in order to assign a priority of control. Override commands are categorized as being related to occupant safety, vehicle safety or occupant comfort. Highest priority is assigned to override commands categorized as being related to occupant safety, second-highest priority is assigned to override commands categorized as being related to vehicle safety, and third-highest priority is assigned to override commands categorized as being related to occupant comfort. An HVAC controller carrying out the control method then regulates the control parameter in accordance with the override command that has been assigned the highest priority.

60 Claims, 3 Drawing Sheets

| OCCUPANT SAFETY | VEHICLE SAFETY | OCCUPANT COMFORT |
|---|---|---|
| COMPRESSOR SEIZURE | ENGINE OVERHEATING | DRIVER TEMPERATURE OVERRIDE |
| SNOW INGESTION PREVENTION | ENGINE POWER MAXIMIZING | CABIN PURGE |
| WINDOW FOG PREVENTION | ELECTRICAL LOAD MANAGEMENT | TRANSIENT WARM-UP / COOL-DOWN |
| EXCESSIVE REFRIGERANT BUILDUP | HIGH HEAD PRESSURE | HEAVY RAIN |
| MODE DOOR POSITION ERROR | EVAPORATOR FREEZE PREVENTION | POOR OUTSIDE AIR QUALITY |
| TEMP DOOR POSITION ERROR | | POOR INSIDE AIR QUALITY |
| AIR INLET DOOR POSITION ERROR | | ENERGY EFFICIENT AIR CONDITIONING |
| | | HUMIDITY CONTROL |

| OCCUPANT SAFETY | VEHICLE SAFETY | OCCUPANT COMFORT |
|---|---|---|
| COMPRESSOR SEIZURE | ENGINE OVERHEATING | DRIVER TEMPERATURE OVERRIDE |
| SNOW INGESTION PREVENTION | ENGINE POWER MAXIMIZING | CABIN PURGE |
| WINDOW FOG PREVENTION | ELECTRICAL LOAD MANAGEMENT | TRANSIENT WARM-UP / COOL-DOWN |
| EXCESSIVE REFRIGERANT BUILDUP | HIGH HEAD PRESSURE | HEAVY RAIN |
| MODE DOOR POSITION ERROR | EVAPORATOR FREEZE PREVENTION | POOR OUTSIDE AIR QUALITY |
| TEMP DOOR POSITION ERROR | | POOR INSIDE AIR QUALITY |
| AIR INLET DOOR POSITION ERROR | | ENERGY EFFICIENT AIR CONDITIONING |
| | | HUMIDITY CONTROL |

FIG. 2

HIERARCHICAL CONTROL METHOD FOR A MOTOR VEHICLE HVAC SYSTEM

TECHNICAL FIELD

The present invention relates to the control of a motor vehicle heating, ventilation and air conditioning (HVAC) system, and more particularly to a hierarchical method of scheduling overrides of various control parameters.

BACKGROUND OF THE INVENTION

A typical motor vehicle HVAC system has several control parameters that are ordinarily adjusted, either manually or automatically, to achieve a desired cabin air temperature and humidity level. These parameters may include, for example, the position of doors or other mechanisms that regulate the air inlet source and the air discharge temperature and location, the capacity of the refrigerant compressor, and the blower speed. However, many HVAC systems are configured to permit overriding of the normal control settings under certain conditions. For example, most automatic climate control systems allow the driver to manually override the blower speed and the air discharge location, and both manual and automatic systems include a provision for automatically disengaging the compressor clutch when the high side pressure is too high, or during full-throttle engine acceleration. Many other override controls have also been suggested, such as forcing the system into a defrost mode when windshield fogging is likely, forcing the temperature control door to full heat when the engine coolant temperature is too high, and forcing the air inlet control door to cabin air recirculation when an ambient air quality sensor indicates the presence of significant pollution levels. As the control sophistication level increases, there can be conflicting override commands, and there is a growing need for a hierarchical control method for sorting through the various override commands in order to properly adjust the respective control parameters.

SUMMARY OF THE INVENTION

The present invention is directed to an improved control method for a motor vehicle HVAC system, where the system includes at least one control parameter that is ordinarily regulated in accordance with a normal control setting, and where override commands for the control parameter are categorized for the purpose of assigning a priority of control. In particular, the override commands are categorized as being related to occupant safety, vehicle safety or occupant comfort. Highest priority is assigned to override commands categorized as being related to occupant safety, second-highest priority is assigned to override commands categorized as being related to vehicle safety, and third-highest priority is assigned to override commands categorized as being related to occupant comfort. An HVAC controller carrying out the control method then regulates the control parameter in accordance with the override command that has been assigned the highest priority.

BRIEF DESCRIPTION OF THE DRAWINGS

The present invention will now be described, by way of example, with reference to the accompanying drawings, in which:

FIG. 2 is a table of potential override conditions categorized by priority.

DESCRIPTION OF THE PREFERRED EMBODIMENT

Figure 1:
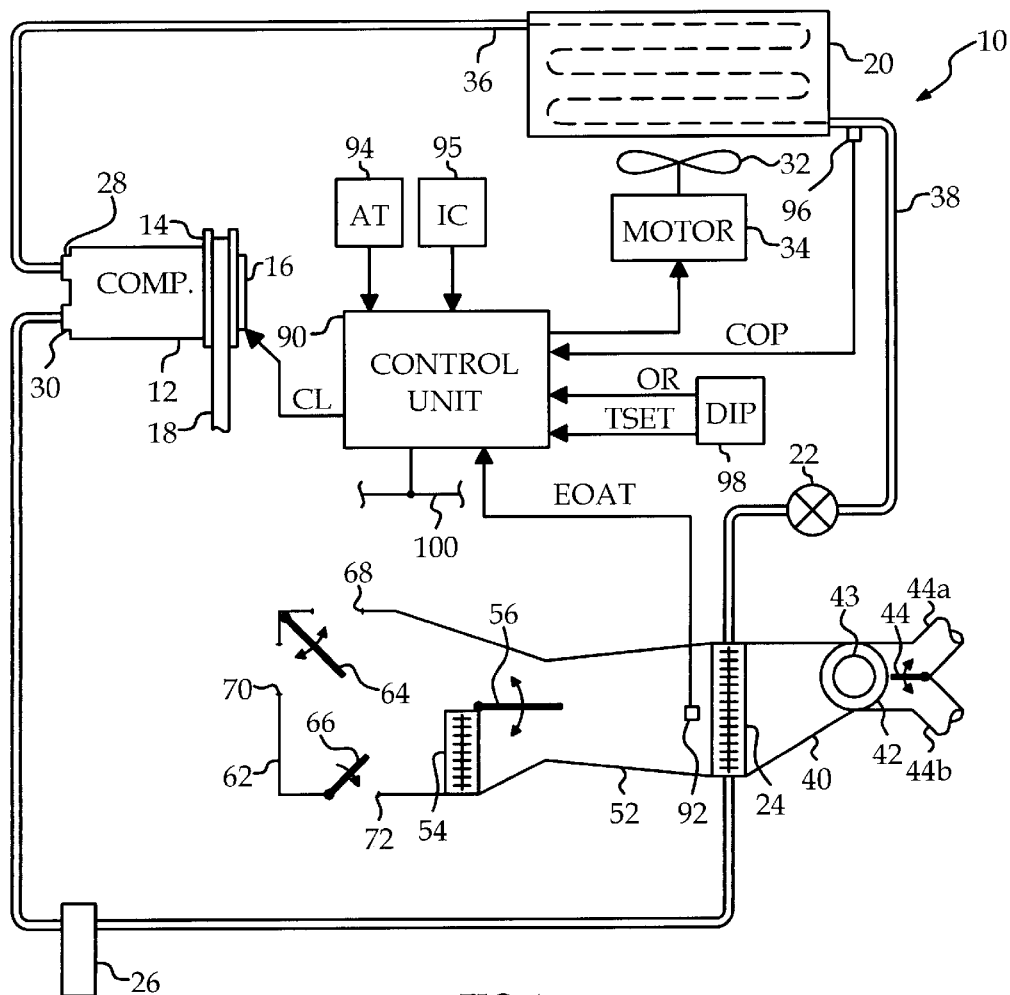
FIG. 1 is a diagram of a motor vehicle air conditioning system including a microprocessor-based control unit.

Referring to FIG. 1, the reference numeral 10 generally designates a motor vehicle HVAC system, including a fixed capacity refrigerant compressor 12 coupled to a drive pulley 14 via an electrically activated clutch 16. Alternately, the compressor 12 may have a variable capacity that is pneumatically or electrically controlled, as is well known in the art. The pulley 14 is coupled to a rotary shaft of the vehicle engine (not shown) via drive belt 18, and the clutch 16 is selectively engaged or disengaged to turn the compressor 12 on or off, respectively. The HVAC system 10 further includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 26 for removing heat from the high pressure refrigerant in condenser 20. The orifice tube 22 allows the cooled high pressure refrigerant in line 38 to expand in an isenthalpic fashion before passing through the evaporator 24. The accumulator/dehydrator 26 separates low pressure gaseous and liquid refrigerant, directs gaseous refrigerant to the compressor suction port 30, and stores excess refrigerant that is not in circulation. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is available at the TXV inlet.

The evaporator 24 is formed as an array of finned refrigerant conducting tubes, and an air intake duct 40 disposed on one side of evaporator 24 houses a motor driven ventilation blower 42 for forcing air past the evaporator tubes. The duct 40 is bifurcated upstream of the blower 42, and an inlet air control door 44 is adjustable as shown to control inlet air mixing; depending on the door position, outside air may enter blower 42 through duct leg 44a, and passenger compartment air may enter blower 42 through duct leg 44b.

An air outlet duct 52 disposed on the downstream side of blower 42 and evaporator 24 houses a heater core 54 formed as an array of finned tubes through which flows engine coolant. The heater core 54 effectively bifurcates the outlet duct 52, and a re-heat door 56 pivoted at a point next to heater core 54 is adjustable as shown to control how much of the air must pass through the heater core 54. The heated and un-heated air portions are mixed in a plenum portion 62 of outlet duct 52 downstream of re-heat door 56, and a pair of air discharge mode control doors 64, 66 direct the mixed air through one or more outlets, including a defrost outlet 68, a panel outlet 70, and a heater outlet 72. The mode control door 64 is adjustable as shown to switch the outlet air between defrost and panel outlets 68, 70, while the mode control door 66 is adjustable as shown to control airflow through heater outlet 72.

The system 10 additionally includes a microprocessor-based controller 90 and a driver interface panel 98. The controller 90 regulates the operation of various system parameters including the compressor clutch 16, the blower motor 43, the condenser fan motor 34, and the positions of doors 44, 56, 64, 66 in response to various inputs, although the output signals and actuators for the fan motor 43 and air control doors 44, 56, 64, 66 have been omitted for simplicity. In general, the compressor clutch 16 is cycled on and off as required to maintain the evaporator outlet air temperature EOAT within predefined temperature limits, and the condenser motor 34 is activated based on the condenser outlet pressure COP. As indicated, EOAT is measured by a temperature sensor 92 positioned on the evaporator 24 or in its outlet air stream, and COP is measured by a suitable pressure sensor 96 located at the outlet of condenser 20. The blower motor 43 and the air control doors 44, 56, 64, 66 are controlled by an automatic climate control algorithm based on various inputs, including the in-car air temperature IC, the ambient air temperature AT, and a driver set temperature TSET. The temperatures AT and IC are developed by suitably positioned temperature sensors 94 and 95, and the set temperature TSET is provided by the driver interface panel 98, as shown. The automatic climate control algorithm essentially computes the cooling requirement of the vehicle, and retrieves pre-programmed command settings for the blower speed, the air discharge mode, the cabin air recirculation level, and the air discharge temperature. The commanded air discharge mode is used to position the mode control doors 64 and 66, the commanded blower speed is used to activate blower motor 43, and the commanded cabin air recirculation level is used to position the air inlet control door 44. The commanded air discharge temperature is compared with a measured discharge temperature (such as an air duct temperature) to produce an error signal that is used to control the temperature control door 56.

The driver interface panel 98 typically has the capability of generating manual override control signals for the blower speed, cabin air recirculation, and air discharge mode, such signals being designated generally in FIG. 1 by the driver interface panel output signal OR. When active, such manual override settings are given priority over the preprogrammed settings of the automatic climate control algorithm. For example, certain drivers may prefer a lower blower speed than prescribed by the automatic climate control algorithm, in which case the driver can create an override setting that reduces the blower speed. A variety of other override controls are also possible, some of which are generated by the control unit 90, and some which are generated by other vehicle controllers such as a powertrain controller or a vehicle body controller. For this and other reasons, the various controllers in a modern vehicle (including the control unit 90) are typically coupled to a data bus 100 as shown to facilitate information sharing.

As the number of potential override commands increases, the likelihood of a conflict also increases. For example, it has been separately proposed to force the inlet air control door to (1) full outside air in response to detected windshield fogging, (2) full cabin air recirculation in the presence of poor outside air quality, (3) full outside air in the presence of poor cabin air quality, and (4) full cabin air recirculation in cold ambient temperatures to prevent snow ingestion. Conflicting override commands become inevitable when numerous override functions are utilized in a single vehicle, and the present invention is directed to a hierarchical control method carried out by the control unit 90 for sorting through potentially conflicting override commands in order to properly adjust the respective control parameters. In general, the various possible override commands are categorized as being related to occupant safety, vehicle safety or occupant comfort for the purpose of assigning a priority of control. Highest priority is assigned to override commands related to occupant safety, second-highest priority is assigned to override commands related to vehicle safety, and third-highest priority is assigned to override commands related to occupant comfort. When there is more than one active override command for a given control parameter, the control unit 90 adjusts that control parameter in accordance with the override command that has been assigned the highest priority.

The table of FIG. 2 depicts examples of various override conditions and their respective priority assignment. The conditions in the Occupant Safety column include: (1) compressor seizure, (2) snow ingestion prevention, (3) window fog prevention, (4) excessive refrigerant buildup prevention, (5) mode door position error, (6) temperature door position error, and (7) air inlet door position error. The conditions in the Vehicle Safety column include: (1) engine overheating, (2) engine power maximization, (3) electrical load management, (4) excessive refrigerant head pressure, and (5) evaporator freeze protection. The conditions in the Occupant Comfort column include: (1) driver temperature overrides, (2) cabin purge, (3) transient warm-up and cool-down, (4) heavy rain, (5) poor quality outside air, (6) poor quality inside air, and (7) energy efficient AC control, and (8) cabin humidity control. These override conditions are briefly discussed below.

A compressor seizure override occurs when a mechanical failure locks the internal rotating parts of compressor 12. In this case, the pulley 14 is unable to turn the internal assembly of the compressor 12, and the belt 18 (which typically also operates critical powertrain components such as the alternator, the water pump, and the power steering pump) can fail if the clutch 16 is not disengaged. There are several well-known techniques for detecting compressor seizure, but the response is always to de-energize clutch 16 as soon as possible.

A snow ingestion prevention override occurs when the outside air temperature is below freezing and the engine coolant temperature is also very low. In this condition, snow can enter the heater core 54 and cause fogging or frosting of the windshield. When the condition is detected, override commands are issued to move the air inlet control door 44 to full cabin air recirculation, and the blower motor 43 is controlled as a function of engine coolant temperature CT to minimize blower speed. Once the coolant has warmed sufficiently, normal operation is restored.

The window fogging prevention override can occur when a vehicle is started after a short period of inactivity and the evaporator 24 may be wet due to previous operation of the compressor 12. If the evaporator 24 is not completely drained, the water can vaporize and cause windshield fogging. When this condition is detected, override commands are issued to temporarily set the air discharge mode to bi-level or heat, and to activate blower motor 43 at a high speed to blow the moisture away from the windshield. A window fogging prevention override can also occur during vehicle operation when the windshield temperature approaches or falls below the cabin air dew point. When this condition is detected, override commands are issued to direct warm air to the windshield with increased airflow, to engage the compressor clutch 16 to dehumidify the air, and to activate the rear window defogger if the vehicle is so equipped.

The excessive refrigerant build-up prevention override can occur in some systems due to a refrigerant leak in the evaporator 24. This condition can be detected by a refrigerant sensor, in which case override commands are issued to move the inlet air control door 44 to full outside air and to activate blower motor 43 at a high speed to quickly reduce the refrigerant concentration.

The mode control door positioning error override occurs when it is determined that one or more of the mode control doors 64, 66 cannot be positioned properly. In this case, override commands are issued to set the air discharge mode to full defrost unless the panel mode is manually selected. Essentially, the defrost mode is selected as the default mode because it allows defogging and defrosting of the windshield while providing cabin warming and cooling.

The temperature door positioning error override occurs when it is determined that the temperature control door 56 cannot be positioned properly. In this case, override commands are issued to move the temperature control door 56 to full hot whenever defrost, blend, or heat modes are active, and otherwise to full cold.

The air inlet door positioning error override occurs when it is determined that the air inlet control door 44 cannot be positioned properly. In this case, override commands are issued to move the air inlet control door 44 to full outside air.

The engine overheating override typically occurs when the engine coolant temperature is too high. In this case, override commands are issued to set the air discharge mode to blend or defrost, to move the temperature control door 56 to full hot, and to activate blower motor 43 at a high speed. In some cases, continued operation of compressor 12 is permitted with the inlet air control door 44 positioned to full cabin air recirculation; in other cases the compressor clutch 16 may be commanded off to reduce engine load.

The engine power maximization override typically occurs during wide open throttle engine acceleration. In this case, an override command is issued to unload the compressor 12, either by de-stroking in the case of a variable capacity compressor, or by disengaging the compressor clutch 16.

The electrical load management override can occur if the ignition voltage or battery voltage drops below a threshold level due to heavy electrical loading. In this case, override commands can be issued to turn off the blower motor 43 unless defrost or blend modes are manually selected.

The high refrigerant head pressure override occurs when the compressor discharge pressure exceeds a threshold. In this case, override commands are issued to reduce the compressor capacity and the blower motor speed, and to set the inlet air control door 44 to full cabin air recirculation to prevent compressor cutout. The compressor clutch 16 can be disengaged if the high head pressure remains high or a system malfunction is detected.

The evaporator freeze protection override occurs when the evaporator temperature or pressure falls below a threshold. In this case, override commands are issued to reduce the compressor capacity or to temporarily disengage the compressor clutch.

The driver temperature overrides occur when the driver adjusts the set temperature to full hot or full cold. In this case, override commands are issued to position the temperature control door 56 accordingly.

The cabin purge override occurs when a hot soak condition with high solar intensity is detected. In this case, override commands may be issued to set the inlet air control door 44 to full outside air, to set the temperature control door to full cold, to ramp the blower motor speed to high, and to increase the compressor capacity to maximum.

The transient warm-up and cool-down overrides command the temperature control door 56 to full hot or cold, respectively. In a transient cool-down condition, the blower motor speed is ramped to high and the compressor capacity is commanded to maximum. In a transient warm-up condition, the blower motor remains low or off until the engine coolant temperature rises to a threshold, is thereafter ramped to high based on coolant temperature above the threshold.

The rain override occurs when a rain sensor or wiper activation indicates heavy rain. In this case, override commands are issued to turn on the compressor clutch 16, and to increase its capacity to maximum for defogging. Additionally, a reduced blower motor speed and cabin air recirculation are commanded to reduce moisture intrusion.

The poor outside air quality override is typically detected with an air quality sensor. In this condition, override commands are generated to ramp the blower motor speed to low, and to move the inlet air control door 44 to full cabin air recirculation.

The poor cabin air quality override is typically detected with a cabin air smoke detector or the like. In this condition, override commands are issued to set the blower motor speed to high and to move the inlet air control door 44 to full outside air.

The energy efficient AC control override occurs when the driver enables a reduced capacity control of compressor 12. In this case, override commands are issued to move the temperature control door 56 to full cold, and to regulate the blower motor and air inlet control door 44 so that a certain flow of fresh air is ensured.

Finally, the humidity control override occurs when the relative humidity of the cabin air is too high or too low. In this case, override commands are issued to increase or decrease the compressor capacity and the inlet air control door setting as required to raise or lower the cabin air humidity.

Figure 3:
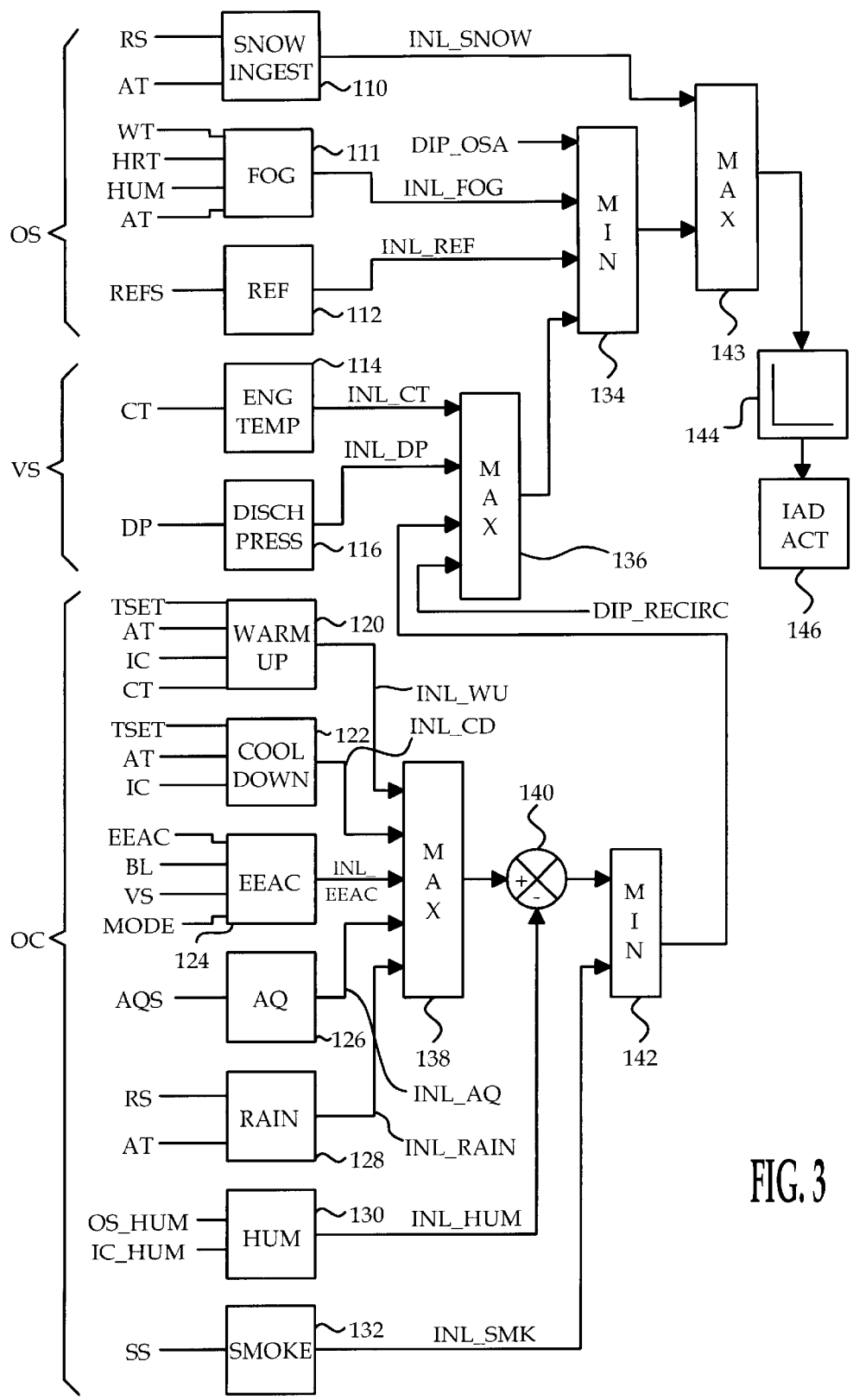
FIG. 3 is a block diagram of a hierarchical control according to this invention, as applied to an air inlet control door of the system of FIG. 1.

In the case of each system control parameter, the control unit 90 processes received or generated overrides by determining their priority and carrying out a control based on the highest priority override in effect. An example of this control method, as applied to the inlet air control door 44, is depicted by the block diagram of FIG. 3. Referring to FIG. 3, the blocks 110–132 represent table look-up and/or logic functions that produce desired position of inlet air control door 44 based on the respective input values.

Block 110 produces a desired inlet air door position INL_SNOW for reducing the likelihood of windshield fogging from snow ingestion, based on CT and AT. In general, when CT is low and AT is below freezing, full cabin air recirculation is requested and the blower motor 43 is turned off to prevent snow from entering the HVAC system and causing immediate fogging or frosting of the windshield.

Block 111 produces a desired inlet air door position INL_FOG for reducing the likelihood of windshield fogging, based on various inputs including: windshield temperature WT, a humidity reference temperature HRT, an estimate or measure of the cabin air humidity HUM, and the ambient temperature AT. In general, the cabin air dewpoint may be determined based on HUM and HRT, and INL_FOG may be determined based on the dewpoint, WT and AT.

Block 112 produces a desired inlet air door position INL_REF for purging the cabin air based on an input REFS supplied by a cabin refrigerant sensor (not shown). In general, INL_REF requests an increasing proportion of outside air as level of detected cabin air refrigerant increases, with full outside air being requested when the detected refrigerant level reaches a predefined threshold.

Block 114 produces a desired inlet air door position INL_CT for utilizing cabin air recirculation to reduce engine loading when a coolant temperature input CT indicates higher than normal engine coolant temperature. Essentially, INL_CT requests an increasing proportion of cabin air recirculation as coolant temperature CT rises above a first threshold. However, if CT exceeds a second threshold higher than the first threshold, the block 114 issues a command to de-activate the compressor clutch 16, after which INL_CT is returned to a full outside air setting.

Block 116 produces a desired inlet air door position INL_DP for utilizing cabin air recirculation to reduce the outlet pressure of compressor 12. The depicted input is the discharge pressure DP, which may be measured by a dedicated sensor, or based on COP if desired. Similar to block 114, the INL_DP output of block 116 requests an increasing proportion of cabin air recirculation as discharge temperature DT rises above a first threshold. However, if DT exceeds a second threshold higher than the first threshold, the compressor clutch 16 is deactivated, and INL_DT is returned to a full outside air setting.

Block 120 produces a desired inlet air door position INL_WU for utilizing cabin air recirculation to assist cabin air warm-up, based on various inputs including: ambient temperature AT, in-car temperature IC, the driver set temperature TSET, and engine coolant temperature CT. If AT is below TSET by at least a calibrated amount, INL_WU is set to either full outside air or full cabin air recirculation depending on IC, TSET and CT. If IC is significantly below TSET, INL_WU requests full outside air until CT rises above a threshold, and then requests full cabin air recirculation. If AT is within the calibrated amount of TSET or higher, INL_WU requests full outside air.

Block 122 produces a desired inlet air door position INL_CD for utilizing cabin air recirculation to assist cabin air cool-down, based on various inputs including: ambient temperature AT, in-car temperature IC, and the driver set temperature TSET. If AT is above TSET by at least a calibrated amount, INL_CD is set to either full outside air or full cabin air recirculation depending on IC, AT and TSET. If IC is significantly above TSET, INL_CD requests fill outside air to purge the cabin air if AT is less than IC, and full cabin air recirculation if AT is the same or higher than IC. If IC is close to or lower than TSET, INL_WU requests full outside air.

Block 124 produces a desired inlet air door position INL_EEAC for utilizing cabin air recirculation to reduce energy consumption when an energy efficient air conditioning (EEAC) mode of operation is enabled. If the system 10 is operating in a steady-state cooling mode, and EEAC is enabled (by a switch on the driver interface panel 98, for example), INL_EEAC requests an inlet air setting that maximizes cabin air recirculation while preserving a certain amount of fresh air in the inlet air stream. Ideally, the setting requested by INL_EEAC should provide approximately 15 CFM of outside air per vehicle occupant. In practice, INL_EEAC may be calibrated based on the vehicle occupant capacity, the blower speed BL, the vehicle speed VS and the air discharge location MODE.

Blocks 126 and 132 produce desired inlet air door position signals INL_AQ and INL_SS for utilizing cabin air recirculation to improve cabin air quality. The block 126 is responsive to the output AQS of an outside air quality sensor (not shown); if poor outside air quality is indicated, INL_AQ requests full cabin air recirculation. The block 132 is responsive to the output SS of a cabin air smoke sensor (not shown); if the presence of smoke is indicated, INL_SMK requests full outside air.

Block 128 produces a desired inlet air door position INL_RAIN for utilizing cabin air recirculation to reduce the likelihood of excessive moisture intrusion in the presence of heavy rainfall. The input RS may be produced by a rain sensor (not shown) or may be inferred based on the selected wiper speed. Essentially, the proportion of recirculated cabin air is increased with increasing rainfall intensity, with full cabin air recirculation being requested in the presence of heavy rain (which may also occur in a car wash). At the same time, the block 128 will typically request activation of the compressor clutch 16 to provide dehumidification and fog prevention.

Finally, block 130 produces an inlet air door adjustment INL_HUM for utilizing cabin air recirculation to control cabin air humidity during steady state cabin air temperature regulation. If the in-car humidity IC_HUM is too low, the block 130 reduces the compressor capacity, and requests an increased proportion of inlet outside air if the outside humidity OS_HUM is higher than IC_HUM, so long as the system 10 is able to maintain the driver set temperature TSET. On the other hand, if the in-car humidity IC_HUM is too high, the block 130 increases the compressor capacity, and requests an increased proportion of recirculated inlet air so long as the system 10 is able to maintain the driver set temperature TSET.

It will be understood, of course, that the above described control functions are not exhaustive in nature, and that any given vehicle may be equipped with a lesser or greater number of functional blocks that attempt to override the normal or automatic setting of the inlet air control door. But with respect to the functional blocks depicted in FIG. 3, the blocks 110, 111 and 112 may be categorized as pertaining primarily to occupant safety OS, the blocks 114 and 116 may be categorized as pertaining primarily to vehicle safety VS, and the blocks 120, 122, 124, 126, 128, 130 and 132 maybe categorized as pertaining primarily to occupant comfort OC. The control priority is determined by the blocks 134–143, which essentially give highest priority to occupant safety OS, second-highest priority to vehicle safety VS, and third highest priority to occupant comfort OC. The terms MAX and MIN assigned to blocks 134, 136, 138, 142, 143 refer to the maximum and minimum amounts of requested cabin air recirculation. That is, a MAX block (such as blocks 136, 138 and 143) will pass the input corresponding to the greatest proportion of recirculated inlet air, and a MIN block (such as blocks 134 and 142) will pass the input corresponding to the least proportion of recirculated inlet air.

The inlet air door position override requests under the category of occupant comfort OC (that is, INL_WU, INL_CD, INL_EEAC, INL_AQ, INL_RAIN, INL_HUM and INL_SMK) are arbitrated by the blocks 138, 140 and 142. The override requests that would increase cabin air recirculation—i.e., the outputs of blocks 120–128—are applied as inputs to MAX block 138, which passes the input requesting the greatest proportion of recirculated cabin air to the summing junction 140. The summing junction 140 combines the output of block 138 with the output INL_HUM of block 130, which can raise or lower the output of block 138 depending on whether cabin air recirculation will change the cabin humidity in the desired direction. The outputs of summing junction 140 and block 132 are then applied as inputs to MIN block 142, which passes the input requesting the least proportion of recirculated cabin air. Thus, the blocks 120–128 are given equal priority to the extent they request increased cabin air recirculation, the block 130 trims the highest of the blocks 120–128 for cabin air humidity control, and the cabin air purge functionality of block 132 is given priority over the functionality of blocks 120–130. In other words, the cabin purge function of block 132 may not ultimately win because it pertains primarily to occupant comfort, but the other occupant comfort-related requests are not allowed to increase the amount of cabin air recirculation when smoke is detected in the vehicle cabin.

The output of MIN block 142 (which represents the outcome of the occupant comfort arbitration) is applied as an input to MAX block 136, along with the driver's cabin air recirculation request DIP_RECIRC and the outputs INL_CT and INL_DP of blocks 114 and 116. In the illustrated embodiment, the driver requests for inlet recirculation (DIP_RECIRC) and outside air (DIP_OSA) are produced by driver manipulated switches or selectors on the driver interface panel 98, and are considered as driver overrides of the automatic control carried out by control unit 90. As described above, the vehicle safety-related functions represented by blocks 114 and 116 operate when activated to increase cabin air recirculation. The same can be said of the driver air circulation request DIP_RECIRC, and of the output of block 142 so long as the cabin smoke purge function is not active. Since the MAX block 136 selects the input requesting the highest amount of cabin air recirculation, it will be seen that the occupant comfort-related inlet air control requests are subjugated to both the driver override command and the vehicle safety-related inlet air control functions.

The output of block 136 is applied an input to MIN block 134 along with the driver outside air request DIP_OSA and the outputs INL_FOG and INL_REF of blocks 111 and 112. As described above, the occupant safety-related functions represented by blocks 111 and 112 operate when activated to decrease cabin air recirculation. The same can be said of the driver outside air request DIP_OSA. Since the MIN block 134 selects the input requesting the least amount of cabin air recirculation, it will be seen that the vehicle safety-related inlet air control requests are subjugated to both the driver override command DIP_OSA and the occupant safety-related inlet air control functions. The outputs of MIN block 134 and snow ingestion block 110 are applied as inputs to MAX block 143. Since the MAX block 143 selects the input requesting the greatest amount of cabin air recirculation, the block 143 allows the prevention of snow ingestion to override control functions that operate to restrict the amount of cabin air recirculation. The output of block 143 thus represents the highest priority request of the inlet air control door 44; such output is applied to block 144 which determines a corresponding actuator position command, which in turn is applied to an inlet air door actuator 146.

In summary, the normal or automatic setting of the inlet air control door 44 may theoretically be overridden by any of a number of competing control functions, and this invention defines a hierarchical control for positioning the door 44 in accordance with the control function having the highest priority. In general, the normal or automatic setting will be overridden (1) in the direction of increased outside air whenever a driver outside air request or an occupant safety-related override other than snow ingestion prevention is active, (2) in the direction of increased cabin air recirculation whenever a vehicle safety-related override is active so long as no conflicting driver or occupant safety-related overrides are active; and (3) in accordance with an active occupant comfort-related override so long as no conflicting driver or occupant safety-related or vehicle safety-related overrides are active.

It will be understood, of course, that the hierarchical control strategy illustrated above in respect to the inlet air control door 44 is also applied to the other control parameters of system 10, including the air discharge mode control doors 64 and 66, the temperature control door 56, blower motor 43, and compressor clutch 16. The air discharge mode control doors 64, 66 can be affected by the override conditions: window fog prevention, mode door position error, driver override, engine over-heating, and heavy rain. The temperature control door 44 can be affected by the override conditions: window fog prevention, temperature door position error, engine overheating, driver override, cabin purge, transient warm-up and cool-down, and energy efficient air conditioning. The blower motor 43 can be affected by the override conditions: window fog prevention, refrigerant build-up prevention, engine over-heating, electrical load management, high system head pressure, manual override, cabin purge, transient warm-up and cool-down, heavy rain, poor outside air quality, poor inside air quality, and energy efficient air conditioning. The compressor clutch 16 can be affected by the override conditions: compressor seizure, window fog prevention, engine over-heating, electrical load management, high system head pressure, evaporator freeze protection, manual temperature overrides, cabin purge, transient warm-up and cool-down, heavy rain, and energy efficient air conditioning. In systems incorporating a compressor having a controlled pumping capacity, the override conditions pertaining to the compressor clutch 16 may also be used to override the normal control of a compressor capacity control valve, as mentioned above. The potential override conditions for each of the above-mentioned control parameters are categorized as illustrated in FIG. 2, the active override having the highest priority is identified (as illustrated by the MAX and MIN blocks in FIG. 3), and the respective control parameter is regulated in accordance with the highest priority.

While this invention has been described in respect to the illustrated embodiment, it is expected that various modifications in addition to those mentioned above will occur to those skilled in the art. Accordingly, it will be understood that this invention is not limited to the illustrated embodiment, but rather is defined by the appended claims.

What is claimed is:

1. A method of operation for a climate control system of a motor vehicle, where the system includes at least one control parameter that is ordinarily regulated in accordance with a normal control setting, the method comprising the steps of:

developing override commands for said control parameter in response to detected operating conditions of said climate control system or said motor vehicle;

categorizing the developed override commands as being related to occupant safety, vehicle safety or occupant comfort;

assigning first-highest priority to override commands categorized as being related to occupant safety, second-highest priority to override commands categorized as being related to vehicle safety, and third-highest priority to override commands categorized as being related to occupant comfort; and regulating the control parameter in accordance with a developed override command that has been assigned the highest priority.

2. The method of operation of claim 1, wherein the developed override commands include override commands developed in response to operator adjustment of an input device.

3. The method of operation of claim 1, wherein the climate control system is configured to receive inlet air from inside or outside a cabin of the vehicle depending on the position of an inlet air control mechanism, and said control parameter positions said inlet air control mechanism.

4. The method of operation of claim 3, wherein said detected operating conditions include a condition of potential snow ingestion, and the developed override commands include a command for positioning said inlet air control mechanism to receive inlet air from inside the vehicle cabin.

5. The method of operation of claim 3, including the steps of:

developing a fog prevention override command for said inlet air control mechanism in response to a detected condition of potential windshield fogging; and categorizing said fog prevention override command as being related to occupant safety.

6. The method of operation of claim 3, including the steps of:

developing a refrigerant build-up override command for positioning said inlet air control mechanism to receive air from outside the cabin in response to a detected condition of refrigerant leakage; and categorizing said refrigerant build-up override command as being related to occupant safety.

7. The method of operation of claim 3, including the steps of:

developing an overheating override command for said inlet air control mechanism in response to a detected condition of vehicle engine overheating; and categorizing said overheating override command as being related to vehicle safety.

8. The method of operation of claim 3, including the steps of:

developing a discharge pressure override command for said inlet air control mechanism in response to a detected condition of excessive refrigerant discharge pressure; and categorizing said discharge pressure override command as being related to vehicle safety.

9. The method of operation of claim 3, including the steps of:

developing a transient cabin temperature control override command for said inlet air control mechanism in response to a detected hot or cold soak condition of said cabin; and categorizing said transient cabin temperature override command as being related to occupant comfort.

10. The method of operation of claim 3, including the steps of:

developing an energy efficiency override command for said inlet air control mechanism in response to a detected request for energy efficient air conditioning; and categorizing said energy efficiency override command as being related to occupant comfort.

11. The method of operation of claim 3, including the steps of:

developing an outside air quality override command for positioning said inlet air control mechanism to receive air from inside the cabin in response to a detected condition of poor outside air quality; and categorizing said outside air quality override command as being related to occupant comfort.

12. The method of operation of claim 3, including the steps of:

developing an inside air quality override command for positioning said inlet air control mechanism to receive air from outside the cabin in response to a detected condition of poor inside air quality; and categorizing said inside air quality override command as being related to occupant comfort.

13. The method of operation of claim 3, including the steps of:

developing a heavy rain override command for positioning said inlet air control mechanism to receive air from inside the cabin in response to a detected condition of heavy rain; and categorizing said heavy rain override command as being related to occupant comfort.

14. The method of operation of claim 3, including the steps of:

developing a humidity control override command for said inlet air control mechanism in response to a detected condition of incorrect cabin humidity; and categorizing said humidity control override command as being related to occupant comfort.

15. The method of operation of claim 3, including the steps of:

developing a driver override command for said inlet air control mechanism in response to a detected driver request for inlet air from outside the cabin; and categorizing said driver override command as being related to occupant safety.

16. The method of operation of claim 3, including the steps of:

developing a driver override command for said inlet air control mechanism in response to a detected driver request for inlet air from inside the cabin; and categorizing said driver override command as being related to vehicle safety.

17. The method of operation of claim 3, including the steps of:

developing a failure mode override command for said inlet air control mechanism in response to a detected positioning error of said inlet air control mechanism; and categorizing said failure mode override command as being related to occupant safety.

18. The method of operation of claim 1, wherein the climate control system is configured to discharge conditioned air from one or more outlets depending on the position of at least one air discharge control mechanism, and said control parameter positions said air discharge control mechanism.

19. The method of operation of claim 15, including the steps of:

developing a fog prevention override command for said air discharge control mechanism in response to a detected condition of potential windshield fogging; and categorizing said fog prevention override command as being related to occupant safety.

20. The method of operation of claim 15, including the steps of:

developing a failure mode override command for said air discharge control mechanism in response to a detected positioning error of said air discharge control mechanism; and categorizing said failure mode override command as being related to occupant safety.

21. The method of operation of claim 15, including the steps of:

developing a heavy rain override command for positioning said air discharge control mechanism to direct conditioned air on a vehicle windshield in response to a detected condition of heavy rain; and categorizing said heavy rain override command as being related to occupant comfort.

22. The method of operation of claim 15, including the steps of:

developing a driver override command for said air discharge control mechanism in response to a detected driver override of said normal control setting; and categorizing said driver override command as being related to occupant safety.

23. The method of operation of claim 1, wherein the climate control system is configured to control a temperature of air discharged into a vehicle cabin depending on the position of a temperature control mechanism, and said control parameter positions said temperature control mechanism.

24. The method of claim 23, including the steps of:

developing a fog prevention override command for said temperature control mechanism in response to a detected condition of potential windshield fogging; and categorizing said fog prevention override command as being related to occupant safety.

25. The method of claim 23, including the steps of:

developing a failure mode override command for said temperature control mechanism in response to a detected positioning error of said temperature control mechanism; and categorizing said failure mode override command as being related to occupant safety.

26. The method of operation of claim 23, including the steps of:

developing an overheating override command for said temperature control mechanism in response to a detected condition of vehicle engine overheating; and categorizing said overheating override command as being related to vehicle safety.

27. The method of operation of claim 23, including the steps of:

developing a driver override command for said temperature control mechanism in response to a detected driver override of said normal control setting; and categorizing said driver override command as being related to occupant safety.

28. The method of operation of claim 23, including the steps of:

developing a cabin purge override command for said temperature control mechanism in response to a detected hot soak condition; and categorizing said cabin purge override command as being related to occupant comfort.

29. The method of operation of claim 23, including the steps of:

developing a transient cabin temperature control override command for said temperature control mechanism in response to a detected hot or cold soak condition of said cabin; and categorizing said transient cabin temperature override command as being related to occupant comfort.

30. The method of operation of claim 23, including the steps of:

developing an energy efficiency override command for said temperature control mechanism in response to a detected request for energy efficient air conditioning; and categorizing said energy efficiency override command as being related to occupant comfort.

31. The method of operation of claim 23, including the steps of:

developing a driver override command for said temperature control mechanism in response to a detected driver override of said normal control setting; and categorizing said driver override command as being related to occupant safety.

32. The method of operation of claim 1, wherein the climate control system includes a blower driven by a blower motor, and said control parameter determines a speed of said blower motor.

33. The method of operation of claim 32, including the steps of:

developing a driver override command for said blower motor in response to a detected driver override of said normal control setting; and categorizing said driver override command as being related to occupant safety.

34. The method of claim 32, including the steps of:

developing a fog prevention override command for said blower motor in response to a detected condition of potential windshield fogging; and categorizing said fog prevention override command as being related to occupant safety.

35. The method of operation of claim 32, wherein said detected operating conditions include a condition of potential snow ingestion, and the developed override commands include a snow ingestion prevention override command for turning off said blower motor.

36. The method of operation of claim 35, including the steps of:

developing a snow ingestion prevention override command for turning off said blower motor in response to a detected condition of potential snow ingestion; and categorizing said snow ingestion prevention override command as being related to occupant safety.

37. The method of operation of claim 32, including the steps of:

developing an overheating override command for said blower motor in response to a detected condition of vehicle engine overheating; and categorizing said overheating override command as being related to vehicle safety.

38. The method of operation of claim 32, including the steps of:

developing a discharge pressure override command for said blower motor in response to a detected condition of excessive refrigerant discharge pressure; and categorizing said discharge pressure override command as being related to vehicle safety.

39. The method of operation of claim 32, including the steps of:

developing a transient cabin temperature control override command for said blower motor in response to a detected hot or cold soak condition of said cabin; and categorizing said transient cabin temperature override command as being related to occupant comfort.

40. The method of operation of claim 32, including the steps of:

developing an energy efficiency override command for said blower motor in response to a detected request for energy efficient air conditioning; and categorizing said energy efficiency override command as being related to occupant comfort.

41. The method of operation of claim 32, including the steps of:

developing a heavy rain override command for said blower motor in response to a detected condition of heavy rain; and categorizing said heavy rain override command as being related to occupant comfort.

42. The method of operation of claim 32, including the steps of:

developing an outside air quality override command for said blower motor in response to a detected condition of poor outside air quality; and categorizing said outside air quality override command as being related to occupant comfort.

43. The method of operation of claim 32, including the steps of:

developing an inside air quality override command for said blower motor in response to a detected condition of poor inside air quality; and categorizing said inside air quality override command as being related to occupant comfort.

44. The method of operation of claim 32, including the steps of:

developing a refrigerant build-up override command for said blower motor in response to a detected condition of refrigerant leakage; and categorizing said refrigerant build-up override command as being related to occupant safety.

45. The method of operation of claim 32, including the steps of:

developing a cabin purge override command for said blower motor in response to a detected hot soak condition; and categorizing said cabin purge override command as being related to occupant comfort.

46. The method of operation of claim 32, including the steps of:

developing an electrical load management override command for said blower motor in response to a detected heavy electrical loading of said vehicle; and categorizing said electrical load management override command as being related to vehicle safety.

47. The method of operation of claim 32, including the steps of:

developing an energy efficiency override command for said blower motor in response to a detected request for energy efficient air conditioning; and categorizing said energy efficiency override command as being related to occupant comfort.

48. The method of operation of claim 1, wherein the climate control system includes a controlled refrigerant compressor that is driven by a vehicle engine, and said control parameter determines a capacity of said compressor.

49. The method of operation of claim 48, wherein said detected operating conditions include a condition of potential snow ingestion, and the developed override commands includes a command for reducing a capacity of said compressor.

50. The method of operation of claim 48, including the steps of:

developing a fog prevention override command for said compressor in response to a detected condition of potential windshield fogging; and categorizing said fog prevention override command as being related to occupant safety.

51. The method of operation of claim 48, including the steps of:

developing a seizure override command for said compressor in response to a detected seizure of said compressor; and categorizing said seizure override command as being related to occupant safety.

52. The method of operation of claim 48, including the steps of:

developing an overheating override command for said compressor in response to a detected condition of vehicle engine overheating; and categorizing said overheating override command as being related to vehicle safety.

53. The method of operation of claim 48, including the steps of:

developing a discharge pressure override command for said compressor in response to a detected condition of excessive refrigerant discharge pressure; and categorizing said discharge pressure override command as being related to vehicle safety.

54. The method of operation of claim 48, including the steps of:

developing a transient cabin temperature control override command for said compressor in response to a detected hot or cold soak condition of said cabin; and categorizing said transient cabin temperature override command as being related to occupant comfort.

55. The method of operation of claim 48, including the steps of:

developing an engine power override command for said compressor in response to a detected condition of high engine power demand; and categorizing said engine power override command as being related to vehicle safety.

56. The method of operation of claim 48, including the steps of:

developing an outside air quality override command for said compressor in response to a detected condition of poor outside air quality; and categorizing said outside air quality override command as being related to occupant comfort.

57. The method of operation of claim 48, including the steps of:

developing an evaporator freeze protection override command for said compressor in response to a detected condition of potential evaporator freezing; and categorizing said evaporator freeze protection override command as being related to vehicle safety.

58. The method of operation of claim 48, including the steps of:

developing a heavy rain override command for said compressor in response to a detected condition of heavy rain; and categorizing said heavy rain override command as being related to occupant comfort.

59. The method of operation of claim 48, including the steps of:

developing a humidity control override command for said compressor in response to a detected condition of incorrect cabin humidity; and categorizing said humidity control override command as being related to occupant comfort.

60. The method of operation of claim 48, including the steps of:

developing a cabin purge override command for said compressor in response to a detected hot soak condition; and categorizing said cabin purge override command as being related to occupant comfort.

* * * * *